Figure 6:
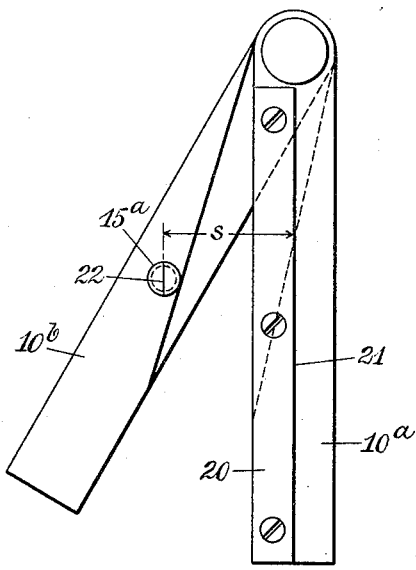

No. 672,213. Patented Apr. 16, 1901.
E. L. HOLCOMB.
ANGLE PROTRACTOR.
(Application filed Apr. 20, 1899.)
(No Model.) 2 Sheets—Sheet 1.
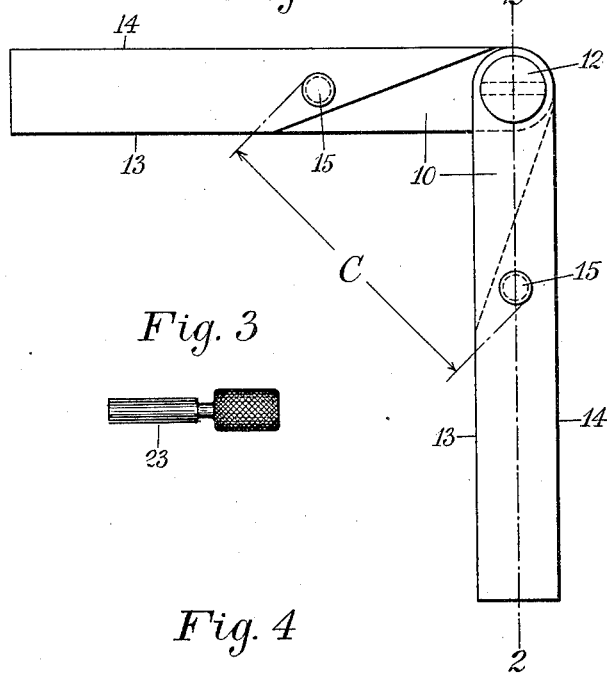
Fig. 1
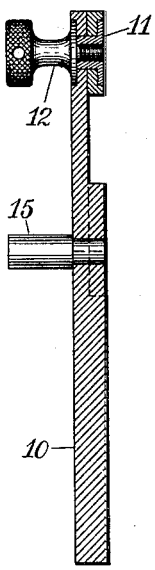
Fig. 2
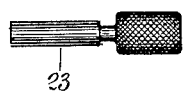
Fig. 3
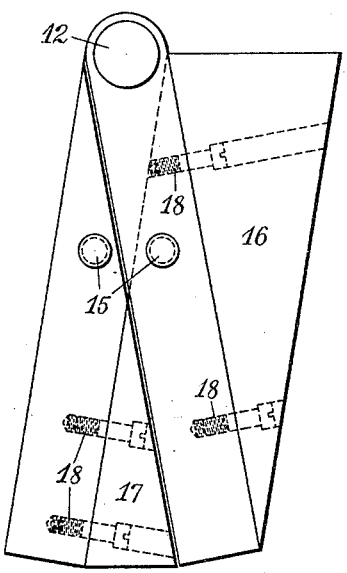
Fig. 4
Fig. 5
| Degrees | | Minute | Chord+.25 |
|---|---|---|---|
| With Blocks | Without Blocks | | C |
| 0 | 20 | 0 | .770945 |
| 0 | 20 | 10 | .775241 |
| 0 | 20 | 20 | .779536 |
| 0 | 20 | 30 | .783831 |
| 0 | 20 | 40 | .788124 |
| 0 | 20 | 50 | .792416 |
| 1 | 21 | 0 | .796707 |
| 1 | 21 | 10 | .800996 |
Witnesses:
H. Mallner
Jennie Nellis
Inventor
Edwin L. Holcomb
By W. H. Honiss, Atty.

No. 672,213. Patented Apr. 16, 1901.
E. L. HOLCOMB.
ANGLE PROTRACTOR.
(Application filed Apr. 20, 1899.)

(No Model.) 2 Sheets—Sheet 2.

Witnesses:
Jennie Nellis Case.
H. Mallner

Inventor
Edwin L. Holcomb
By W. H. Honiss. Atty.

UNITED STATES PATENT OFFICE.

EDWIN L. HOLCOMB, OF HARTFORD, CONNECTICUT.

ANGLE-PROTRACTOR.

SPECIFICATION forming part of Letters Patent No. 672,213, dated April 16, 1901.

Application filed April 20, 1899. Serial No. 713,789. (No model.)

*To all whom it may concern:*

Be it known that I, EDWIN L. HOLCOMB, a citizen of the United States of America, and a resident of Hartford, in the county of Hartford and State of Connecticut, have invented certain new and useful Improvements in Angle-Protractors, of which the following is a specification.

This invention is a protractor for determining the angular relation of lines and surfaces, and is adapted for use in connection with a table of trigonometrical functions, whereby the said angles may be ascertained or determined with mathematical exactness.

Most of the protractors now in use are provided with a graduated arc or quadrant by means of which the angular relation of the protracting-arms of the instrument may be determined within certain limits, dependent upon the many conditions which in such an instrument may tend to vitiate its accuracy. Among these may be mentioned the difficulties attendant upon the perfect construction of an instrument comprehending both the protracting and the angle-indicating functions. Even assuming that the instrument as originally constructed is as perfect as human skill can make it, with its graduations or angle-indicating index in correct relation to the corresponding angles of the gaging edges, it is impossible to set or to read the instrument by its graduations without considerable variation, sometimes in one direction and sometimes in the other, because of the errors of observation in setting to a graduated index or in reading such an index to ascertain the angle at which the arms may stand. Furthermore, such an instrument, even though originally perfect within practical limits, is easily deranged by being allowed to drop and by changes of temperature, which vary the length of the graduated arc or quadrant, so that the instrument must be frequently tested in order that reliance may be placed upon the accuracy of its work. These protractors if accurately made are very expensive, beyond the reach of the great majority of tool-makers, machinists, and other artisans whose work requires the use of such an instrument.

The protractor of the present invention is a simple and comparatively inexpensive instrument, costing little more than an ordinary bevel-gage. The angularly-movable arms of this protractor instead of being connected by means of a graduated arc or quadrant, as in the case of the protractors above referred to, are provided with gaging projections, to which may be applied, by means of a vernier or micrometer caliper, the exact linear measurements corresponding to one of the trigonometrical functions or characteristics, such as the sine tangent or chord of the angle to which it is desired to set the instrument, these measurements being taken from or based upon existing trigonometrical tables which have been calculated with mathematical accuracy to several places of decimals. Thus each and every setting of the instrument is determined by a standard measuring-machine, such as the ordinary micrometer, caliper, which is now manufactured with a high degree of accuracy and is so inexpensive that it is usually comprised among the tools ordinarily owned by the average machinist or tool-maker.

Figure 1 of the drawings is a plan view of this invention, showing it opened substantially to ninety degrees. Fig. 2 is an edge view in section, taken along the line 2 2 of Fig. 1. Fig. 3 is a side view of a gage or test plug which may be used in connection with this instrument. Fig. 4 is also a plan view of the instrument in its closed position, showing in connection therewith adjuncts for extending its scope and capacity. Fig. 5 represents a portion of a table explanatory of the setting of the instrument and useful as an adjunct thereto. Fig. 6 is a plan view; and Fig. 7 an end view projected therefrom, showing a modified form of the instrument whereby it is adapted to be set by linear distances representing the sine of the desired angle.

The numeral 10 designates the arms of the protractor, which are pivotally connected together by means of the bushing 11. This bushing is threaded and is provided with the screw 12, by means of which the tightness of the joint is regulated. The inner and outer protracting edges 13 and 14 of each of the arms are preferably parallel in order to adapt the instruments to both external and internal angles. These arms are jointed together in such a way, preferably by halving each arm, as shown herein, so that the top and bottom surfaces, and especially the latter, lie in the same plane. These arms as thus far described constitute the protracting portion of the instrument. As a means for applying to this instrument the linear measurements corresponding to a trigonometrical function of the desired angle, such as its chord or sine, the arms are provided with gaging projections or jaws the gaging-surfaces of which are parallel with each other and with the axis of the joint of the arms. These projections preferably consist of cylindrical pins or studs 15. These studs are located upon each of the arms at equal distances from their pivotal connection and parallel with the axis thereof. This radial distance between the centers of the pivotal connection or bushing 11 and each of the studs 15 would for ease of adaptation to existing trigonometrical tables, if that were the only consideration, be established at one inch, since most of those tables are computed on the basis of one-inch radius; but for greater accuracy in the setting of the instrument I prefer to establish the studs at one and one-half or two inches radius from the pivotal center, it being only necessary to multiply by one-half or two, respectively, the linear measurements given in the tables in order to adapt them to the corresponding increased radial distance of the studs.

On account of the manner in which it is desirable to make the joint of the arms it is impracticable to close them within an angle of about twenty degrees, as shown in Fig. 4; but in order to adapt it to smaller angles, both external and internal, I provide the instrument with supplemental blocks 16 and 17. These blocks are of the same thickness as the arms 10 and are readily attached thereto or removed therefrom by means of the screws 18. Thus by reference to Fig. 4 it will be seen that both inner and outer gaging edges of the arms are parallel when the instrument is in its closed position, thereby adapting it to be employed for all angles from zero to and beyond ninety degrees, and as also shown by the table of Fig. 5 the setting for an angle of one degree with the blocks is the same as the setting for twenty-one degrees without the blocks, so that the same table of chords may serve for both forms of the instrument.

Figure 7:
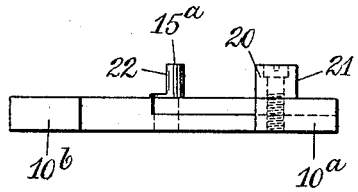

In Figs. 6 and 7 is shown a modification of the instrument by means of which it may be set to determine the angle by the measurement of its sines instead of its chord, as in the previous figures. The right-hand arm 10$^a$ is provided with a longitudinal rib or plate 20, the right-hand or outer edge 21 of which is preferably located in a radial relation to the axis of the joint or substantially along the line 2 2 of Fig. 1. The opposite arm 10$^b$ may be provided with a cylindrical stud 15, like those of the preceding figures; but it is herein shown to be provided with a semicylindrical stud 15$^a$, having one-half of the diameter of its gaging portion cut away, so as to form a gaging-surface 22, located exactly in the plane of the axis of the stud. In setting this modified form of my protractor the measurement to be taken is that of the sine of the desired angle; but in employing cylindrical pins like that of the previous figures it is obviously necessary to add to the sine one-half of the diameter of each pin. It should further be noted that the pin 15$^a$ must be left free to turn in order that its measuring-surface 22 may be turned into a parallel relation with the surface 21 in applying the measurement thereto. This form of stud may also be used, if desired, in connection with the instrument of the preceding figures.

It is not an essential feature of this invention that the gaging-studs 15 and 15$^a$ shall be located along the longitudinal centers of their respective arms, since it is only necessary that the centers of these studs shall bear the same angular relation to the pivot as that borne by the protracting edges of those arms; but for symmetry of appearance and for greater convenience in the construction and testing of the instruments I prefer to locate these studs centrally with their respective arms, as herein shown.

It is important to have the gaging-surfaces of the studs parallel with each other and with the axis of the pivot at all angular positions of the arms. As a means for testing this parallel relation of the studs 15 they may be removed, and a bar or test-plug 23 (shown in Fig. 3) may be inserted in the cylindrical holes in the arms. The distance between these plugs when projecting from one side should exactly equal the distance between them when they are reversed and project from the other side of the arms, and this equality should exist in all angular positions of the arms. For some purposes it may be desirable to employ the plugs 23 in place of the studs 15 in the regular use of the instrument, especially where the presence of the fixed studs might interfere with the application of the gage to particular kinds of work.

The table of Fig. 5 is suited for an instrument in which the studs 15 are one-quarter of an inch in diameter and are located one and one-half inches from the pivotal axis of the arms. The distance C, Figs. 1 and 5, is found by multiplying the chord of the desired angle by one and one-half and adding to the product one-half the diameter of each of the studs 15. A shorter method where the studs are of equal diameter is to take three times the sine of one-half the desired angle and add to the product one diameter of the stud.

This protractor is equally useful in laying out or establishing angles and in ascertaining the angular relation of preëxisting lines or surfaces. In the latter case the procedure is to set the arms 10 to the work, then measure the studs, and then refer to the table for the angle corresponding to the chord measurement thus found.

I claim as my invention—

1. An angle-protractor consisting of pivotally-connected arms each having an angle-protracting edge, the arms being also provided with gaging projections, the gaging-surfaces of which are parallel with each other and with the axis of the arm-pivot, and are adapted to receive from a caliper-gage measurements of trigonometrical functions corresponding with the angles formed by the protracting edges of the arms.

2. An angle-protractor, consisting of a pair of pivotally-connected arms, having protracting edges, and a pair of cylindrical projections located one upon each arm at equal distances from the pivotal connection thereof, with their centers in the same angular relation to the pivot as that borne by the protracting edges of the arms to each other, and adapted to receive from a caliper-gage, the measurements of trigonometrical functions, corresponding with the angles formed by the protracting edges.

3. An angle-protractor consisting of a pair of pivotally-connected arms having plane gaging edges, and a pair of removable and reversible cylindrical studs located one upon each arm at equal radial distances from the pivotal connection, and parallel with the axis thereof, for the purpose specified.

4. In combination with an angle-protractor consisting of a pair of pivotally-mounted gaging-arms which cannot be closed to a parallel position, a removable angular supplemental block adapted to be attached to one of the arms, for the purpose specified.

Signed by me at Hartford, Connecticut, this 15th day of April, 1899.

EDWIN L. HOLCOMB.

Witnesses:
JENNIE NELLIS,
W. H. HONISS.